United States Patent
Mori

(10) Patent No.: US 11,659,825 B2
(45) Date of Patent: May 30, 2023

(54) DUAL-BEARING REEL

(71) Applicant: Shimano Inc., Osaka (JP)

(72) Inventor: Seishu Mori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/722,877

(22) Filed: Apr. 18, 2022

(65) Prior Publication Data

US 2022/0361467 A1    Nov. 17, 2022

(30) Foreign Application Priority Data

May 12, 2021    (JP) .............................. JP2021-080788

(51) Int. Cl.
*A01K 89/01* (2006.01)
*A01K 89/027* (2006.01)
*A01K 89/00* (2006.01)

(52) U.S. Cl.
CPC ........ *A01K 89/0117* (2013.01); *A01K 89/006* (2013.01); *A01K 89/027* (2013.01)

(58) Field of Classification Search
CPC .......... A01K 89/0192; A01K 89/01928; A01K 89/0193; A01K 89/006; A01K 89/0183
See application file for complete search history.

(56) References Cited

U.S. PATENT DOCUMENTS

| | | | | |
|---|---|---|---|---|
| 2001/0038052 | A1* | 11/2001 | Oishi ............... | A01K 89/01907 242/255 |
| 2008/0173745 | A1* | 7/2008 | Takechi ............... | A01K 89/015 242/321 |
| 2012/0056028 | A1* | 3/2012 | Kawasaki ............ | A01K 89/006 242/267 |
| 2015/0115088 | A1* | 4/2015 | Toma ................. | A01K 89/0193 242/283 |

FOREIGN PATENT DOCUMENTS

| | | | | |
|---|---|---|---|---|
| CN | 103168756 A | * | 6/2013 | ......... A01K 89/0155 |
| EP | 2143329 A2 | * | 1/2010 | ......... A01K 89/0178 |
| JP | H8-214741 A | | 8/1996 | |
| JP | 2010000021 A | * | 1/2010 | ........... A01K 89/015 |
| KR | 20160121403 A | * | 10/2016 | ......... A01K 89/0183 |

* cited by examiner

*Primary Examiner* — Emmanuel M Marcelo
(74) *Attorney, Agent, or Firm* — Global IP Counselors, LLP

(57) ABSTRACT

A dual-bearing reel includes a reel body, a handle shaft, a handle, a first bearing, and a roller clutch. The handle shaft has a first end portion and a second end portion on a side opposite the first end portion, and is provided on the reel body so as to be rotatable. The handle is connected to the first end portion of the handle shaft. The first bearing rotatably supports the second end portion of the handle shaft. The roller clutch is arranged so as to overlap the first bearing in an axial direction of the handle shaft as seen from a radial direction of the handle shaft and is configured to prohibit rotation of the handle shaft in one direction.

5 Claims, 3 Drawing Sheets

DUAL-BEARING REEL

CROSS-REFERENCE TO RELATED APPLICATIONS

This application claims priority to Japanese Patent Application No. 2021-080788, filed on May 12, 2021. The entire disclosure of Japanese Patent Application No. 2021-080788 is hereby incorporated herein by reference.

BACKGROUND

Field of the Invention

The present invention relates to a dual-bearing reel.

Background Art

Conventional dual-bearing reels comprising a roller clutch, which prohibits the rotation of the handle shaft in one direction, and a roller bearing, which supports the handle shaft so as to be rotatable, are known from the prior art (see Japanese Laid Open Patent Application No. H08-214741). In these conventional reels, the roller bearing is disposed adjacent to the roller clutch in the axial direction of the handle shaft to constrain the load from the handle shaft from acting unevenly on the rollers of the roller clutch.

SUMMARY

It has been determined that the dual-bearing reel disclosed in Japanese Laid Open Patent Application No. H08-214741, the roller bearing is disposed adjacent to the roller clutch in the axial direction of the handle shaft. That is, the roller bearing and the roller clutch are arranged side by side in the axial direction of the main body of the reel. As a result, the space for arranging the roller clutch and the roller bearing in the axial direction is increased, which in turn may increase the size of the reel body in the axial direction. If the size of the reel body in the axial direction increases, the position of the handle is farther away from the fishing rod, and thus the winding operability and efficiency may be impaired.

Thus, Japanese Laid Open Patent Application No. H09-47195 discloses a dual-bearing reel in which the roller clutch is disposed between left and right side plates of the reel body in order to suppress or avoid an increase in the size of the reel body in the axial direction. However, in the dual-bearing reel of Japanese Laid Open Patent Application No. H09-47195, the size of the handle shaft in the axial direction is increased.

An object of the present disclosure is to reduce the size of the reel body while suppressing or avoiding an increase in the size of the handle shaft in the axial direction of the handle shaft.

A dual-bearing reel according to one aspect of the present invention includes a reel body, a handle shaft, a handle, a first bearing, and a roller clutch. The handle shaft is disposed on the reel body so as to be rotatable. The handle shaft has a first end portion, and a second end portion on the side opposite of the first end portion. The handle is connected to the first end portion of the handle shaft. The first bearing rotatably supports the second end portion of the handle shaft. The roller clutch is arranged so as to overlap the first bearing in the axial direction of the handle shaft as seen from the radial direction of the handle shaft and prohibits the rotation of the handle shaft in one direction.

In this dual-bearing reel, since the roller clutch is arranged so as to overlap the first bearing in the axial direction of the handle shaft as seen from the radial direction of the handle shaft, the size of the reel body can be reduced while suppressing or avoiding an increase in the size of the handle shaft in the axial direction of the handle shaft. Further, because space in the axial direction is easily obtained, it is a simple matter to provide additional functions to the handle shaft, such as a speed changing mechanism.

The handle shaft can also have a recess that is disposed in a second end portion and that is formed in a first direction that runs from a first end portion to the second end portion. The first bearing may be disposed inside the recess of the handle shaft. The roller clutch can be disposed on an outer peripheral side of the second end portion of the handle shaft. Here, because a roller clutch can be used that has a larger diameter than a roller clutch that is arranged inside the recess of the handle shaft, the allowable torque can be increased.

The reel body can also have a support shaft that is disposed inside the recess of the handle shaft and that supports the first bearing. Here, the first bearing can be supported with a simple configuration.

The dual-bearing reel can also have a cylindrical member that is mounted on the handle shaft so as to be integrally rotatable between the first end portion and the second end portion of the handle shaft, and a second bearing that rotatably supports the handle shaft via the cylindrical member. The reel body can have a frame that includes the support shaft and a cover that covers one side of the frame. The second bearing can be disposed on the cover. The cylindrical member can have a projecting portion that protrudes from the outer circumferential surface of the cylindrical member in the radial direction of the handle shaft and that restricts the movement of the second bearing in the first direction. Here, the movement of the second bearing in the first direction can be restricted with a simple configuration. Further, compared to the case in which the second bearing is fixed to the cover with metal fasteners, the number of parts can be reduced.

The outer diameter of the second end portion of the handle shaft can be smaller than the outer diameter of the first end portion. Here, a roller clutch with a large allowable torque can be used.

By embodiments of the present invention, the size of the reel body can be reduced and at the same time the size of the handle shaft in the axial direction can be suppressed.

DETAILED DESCRIPTION OF EMBODIMENTS

Figure 1:
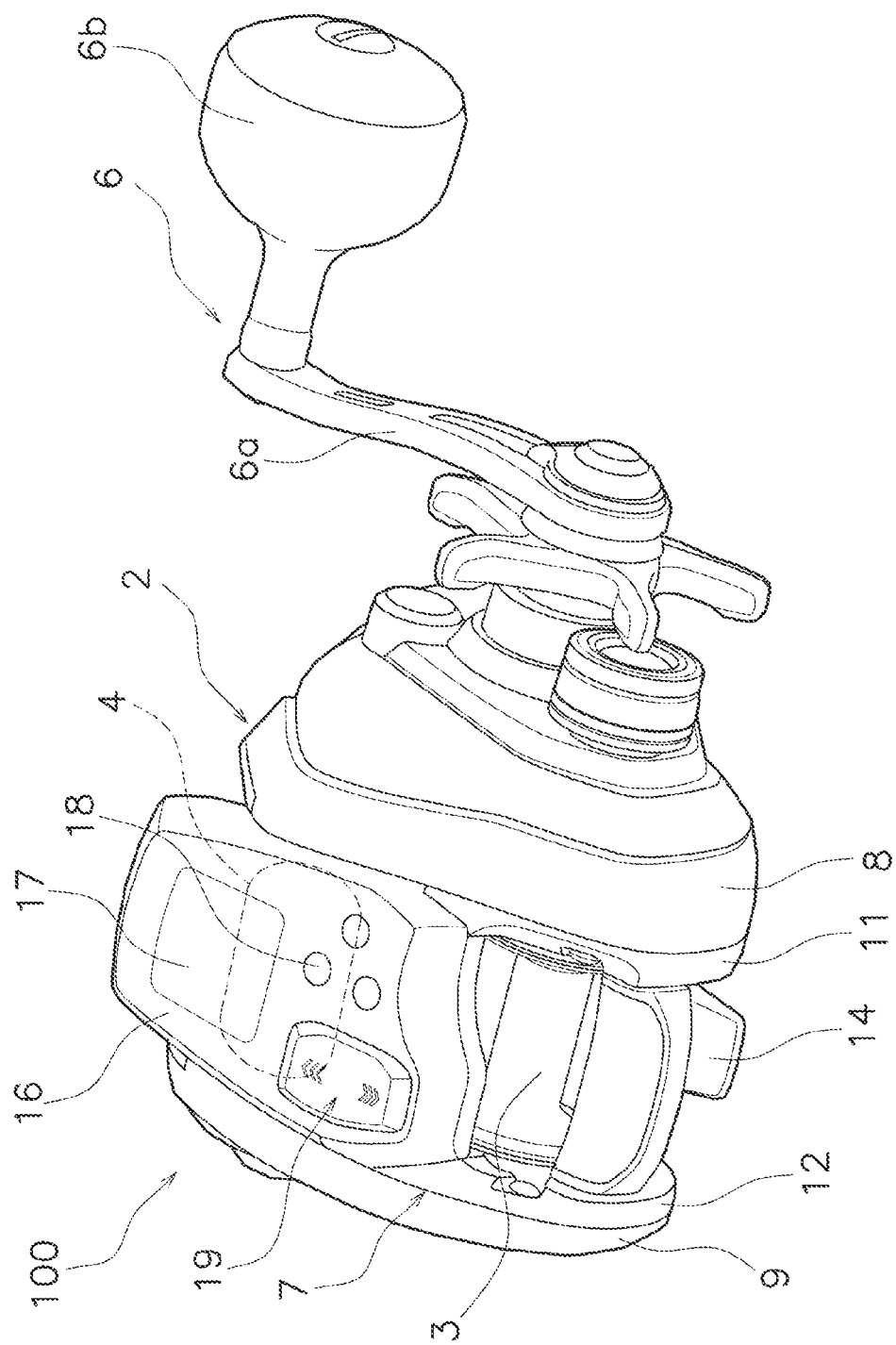
FIG. 1 is a perspective view of a dual-bearing reel according to one embodiment of the present invention
Figure 2:
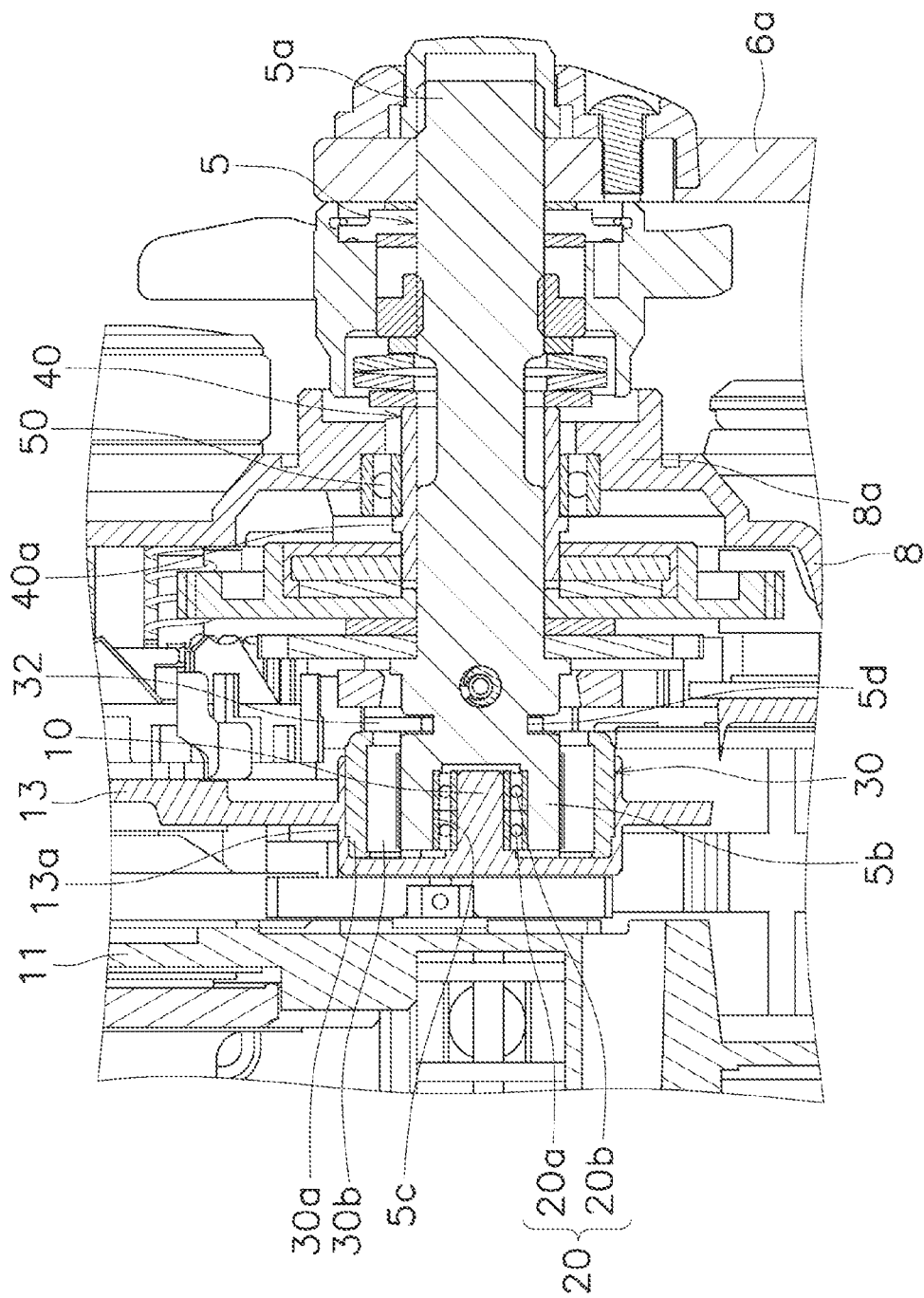
FIG. 2 is a cross-sectional view in the area of the handle shaft.

A dual-bearing reel 100 according to one embodiment of the present invention is an electric reel that can pay out (cast) a fishing line. As shown in FIGS. 1 and 2, the dual bearing reel 100 comprises a reel body 2, a spool 3, a motor 4, a handle shaft 5, a handle 6, a first bearing 20, and a roller clutch 30.

In the following description, the direction in which the fishing line is paid out (casted) during fishing is referred to as the front, and the opposite direction is referred to as the rear. Left and right refer to left and right when the dual-bearing reel 100 is seen from the rear. The direction in which the handle shaft 5 extends is referred to as the axial direction and the direction orthogonal to the axial direction is referred to as the radial direction. The axial direction in the present embodiment coincides with the left-right direction.

The reel body 2 has a frame 7, a first side cover 8, a second side cover 9, and a support shaft 10.

The reel body 2 contains a reciprocating mechanism that operates in conjunction with the spool shaft 3, a rotation transmission mechanism that transmits the rotations of the motor 4 and the handle shaft 5 to the spool 3, a clutch mechanism that transmits and cuts off the rotational force of the handle shaft 6 to the spool 3, a clutch control mechanism that controls the clutch mechanism, and the like.

The frame 7 has a first side plate 11, a second side plate 12, a mechanism mounting plate 13, plural connecting portions, not shown, and a rod mounting portion 14. The first side plate 11 is arranged on the right side of the frame 7. The second side plate 12 is arranged away from the first side plate 11 in the left-right direction. The second side plate 12 is arranged on the left side of the frame 7.

As shown in FIG. 2, the mechanism mounting plate 13 is arranged between the first side plate 11 and the first side cover 8. The mechanism mounting plate 13 is fixed to the right-hand portion of the first side plate 11. Various mechanisms disposed within the reel body 2 are mounted on the mechanism mounting plate 13. The mechanism mounting plate 13 has a support portion 13a. The support portion 13a is a cylindrical recess that extends in the axial direction. The support portion 13a opens toward the right. The support portion 13a supports the roller clutch 30.

The plural connecting portions extend in the left-right direction and connect the first side plate 11 and the second side plate 12. The rod mounting portion 14 is the portion where the fishing rod is mounted, which extends in the front-rear direction at an essentially intermediate position between the first side plate 11 and the second side plate 12.

The first side cover 8 is one example of a cover. The first side cover 8 covers the right side of the frame 7. The first side cover 8 has a boss portion 8a that penetrates therethrough in the axial direction. The boss portion 8a is formed in a tubular shape. The second side cover 9 covers the left side of the frame 7.

The support shaft 10 extends in the axial direction and supports the first bearing 20. The support shaft 10 is formed on the mechanism mounting plate 13 of the frame 7. The support shaft 10 is disposed on the inner circumferential side of the support portion 13a of the mechanism mounting plate 13. The support shaft 10 extends toward the right from the center of the bottom portion of the support portion 13a.

A counter case 16 that is fixed to the first side plate 11 and the second side plate 12 is disposed in the upper portion of the reel body 2. A display unit 17 for displaying water depth, an operation switch 18 used to make various settings of the dual bearing reel 100, a pressing unit 19 for adjusting the output of the motor 4, and the like, are provided on the counter case 16. Further, a control unit, not shown, for carrying out various controls of the dual bearing reel 100 is housed inside the counter case 16.

Fishing line is wound around the outer circumference of the spool 3, which is a member that is rotatably supported by the reel body 2 between the first side plate 11 and the second side plate 12.

The motor 4 is disposed inside the reel body 2. The motor 4 is subjected to PWM control by the control unit and is configured to be rotationally driven in the line-winding direction together with the spool 3 as the pressing unit 19 is pressed.

The handle shaft 5 is provided on the reel body 2 so as to be rotatable. The handle shaft 5 is rotatably supported by the reel body 2 via the first bearing 20 and a second bearing 50, described further below. The handle shaft 5 is arranged to the right of the frame 7. The handle shaft 5 extends in the axial direction and penetrates the boss portion 8a of the first side cover 8 in the axial direction. A drive gear and a drag mechanism are arranged around the axis of the handle shaft 5.

The handle shaft 5 has a first end portion 5a, a second end portion 5b, and a recess 5c. In the present embodiment, the first end portion 5a is the right end portion of the handle shaft 5. The second end portion 5b is on the side opposite the first end portion 5a and is the left end portion of the handle shaft 5. The outer diameter of the second end portion 5b is greater than the outer diameter of the first end portion 5a. The recess 5c is formed in the second end portion 5b. The recess 5c is a cylindrical recess that extends in the axial direction. The recess 5c opens in a first direction that runs from the first end portion 5a to the second end portion 5b. The first direction in the present embodiment coincides with the left direction. The support shaft 10 is disposed inside the recess 5c.

The handle 6 is connected to the first end portion 5a of the handle shaft 5. The handle 6 is fixed to the handle shaft 5 so as to be integrally rotatable therewith. The handle 6 has a handle arm 6a and a grip portion 6b. The handle arm 6a extends in the radial direction. One end of the handle arm 6a is fixed to the first end portion 5a of the handle shaft 5. The grip portion 6b is mounted to the other end of the handle arm 6a.

The first bearing 20 is disposed inside the recess 5c of the handle shaft 5 and rotatably supports the second end portion 5b of the handle shaft 5. The first bearing 20 is supported by the support shaft 10. The first bearing 20 is mounted on the outer circumferential surface of the support shaft 10. In the present embodiment, the first bearing 20 is composed of roller bearings 20a, 20b. The roller bearing 20a and the roller bearing 20b are arranged adjacent to each other in the axial direction.

The roller clutch 30 is arranged on the outer peripheral side of the second end portion 5b of the handle shaft 5 and prohibits the rotation of the handle shaft 5 in one direction. The roller clutch 30 prohibits the rotation of the handle shaft 5 in the direction opposite to the line-winding direction. The roller clutch 30 is mounted on the support portion 13a of the mechanism mounting plate 13. The roller clutch 30 overlaps the first bearing 20 in the axial direction as seen from the radial direction.

The roller clutch 30 has an outer race 30a and a plurality of rolling elements 30b. The outer race 30a is mounted on the support portion 13a of the mechanism mounting plate 13 so as to be rotationally rigid. The inner circumferential surface of the outer race 30a has a cam surface, not shown. The plurality of rolling elements 30b are cylindrical in shape, and are arranged between the inner circumferential surface of the outer race 30a and the outer circumferential surface of the second end portion 5b of the handle shaft 5. The plurality of rolling elements 30b enable the rotation of the handle shaft 5 in the line-winding direction. The roller clutch 30 can have an inner race that is fixed on the outer circumferential surface of the second end portion 5b of the handle shaft 5.

The roller clutch 30 is held in place by a holding plate 32 fixed to the mechanism mounting plate 13 and the support portion 13a of the mechanism mounting plate 13. At least part of the holding plate 32 overlaps the second end portion 5b in the axial direction. Here, the handle shaft 5 has a small diameter portion 5d with an outer diameter that is smaller than the outer diameter of the second end portion 5b. The small diameter portion 5d is arranged adjacent to the second end portion 5b. A portion of the holding plate 32 is arranged so as to surround at least a portion of the outer circumferential surface of the small diameter portion 5d from the radial direction, thereby restricting the movement of the second end portion 5b to the right.

The dual bearing reel 100 has a cylindrical member 40 and the second bearing 50. The cylindrical member 40 is mounted on the handle shaft 5 so as to be integrally rotatable therewith, between the first end portion 5a and the second end portion 5b of the handle shaft 5. The cylindrical member 40 is disposed on the inner side of the boss portion 8a of the first side cover 8. The inner circumferential surface of the cylindrical member 40 is formed in a non-circular shape and is fitted to the outer circumferential surface of the handle shaft 5. The cylindrical member 40 has a projecting portion 40a. The projecting portion 40a protrudes from the outer circumferential surface of the cylindrical member 40 in the radial direction. The projecting portion 40a is formed over the entire circumference of the cylindrical member 40 in the circumferential direction. The projecting portion 40a restricts the movement of the second bearing 50 to the left The second bearing 50 is a roller bearing and rotatably supports the handle shaft 5 via the cylindrical member 40. The second bearing 50 is disposed on the boss portion 8a of the first side cover 8. The inner race of the second bearing 50 is in contact with the projecting portion 40a in the axial direction. The second bearing 50 is restricted from moving axially by the projecting portion 40a and the boss portion 8a.

In the dual bearing reel 100 configured as described above, the first bearing 20 is disposed inside the recess 5c disposed in the second end portion 5b of the handle shaft 5, and the roller clutch 30 is disposed on the outer peripheral side of the second end portion 5b of the handle shaft 5. That is, as seen from the radial direction, the first bearing 20 and the roller clutch 30 are arranged to overlap in the axial direction. As a result, it is possible to reduce the size of the reel body 2 while suppressing or avoiding an increase in the size of the handle shaft 5 in the axial direction.

OTHER EMBODIMENTS

One embodiment of the present invention was described above, but the present invention is not limited to the above-described embodiment, and various modifications can be made without departing from the scope of the invention.

In the above-described embodiment, the present invention is applied to an electric reel, but the present invention may be applied to a dual-bearing reel other than an electric reel.

In the above-described embodiment, the first bearing 20 is composed of plural roller bearings 20a, 20b, but the first bearing 20 may be composed of a single roller bearing.

In the above-described embodiment, the frame 7 has the mechanism mounting plate 13, but the mechanism mounting plate 13 can be omitted. In this embodiment, the support shaft 10 and the support portion 13a can be formed on the first side plate 11 of the frame 7.

Figure 3:
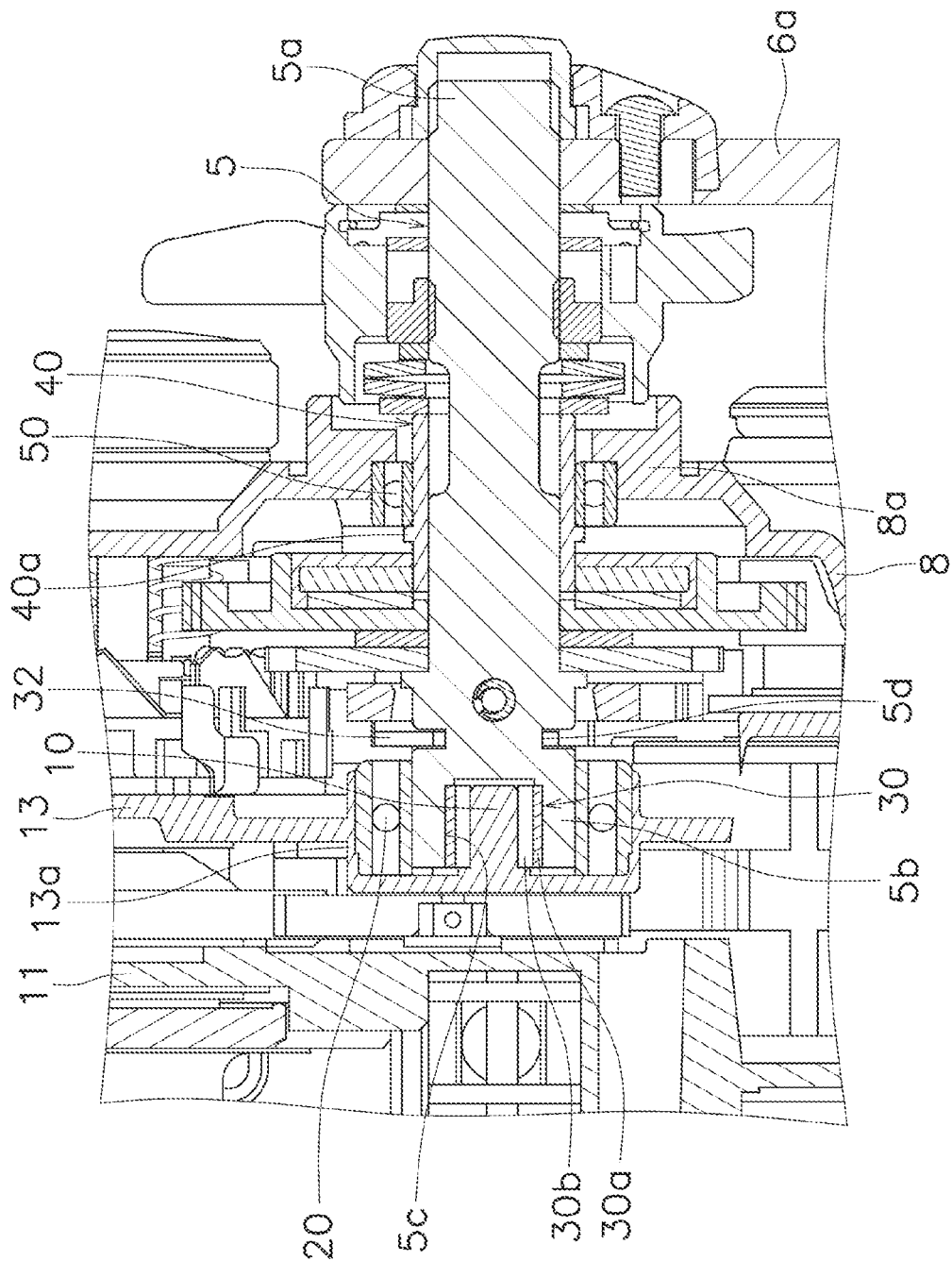
FIG. 3 is a cross-sectional view in the area of the handle shaft in another embodiment.

In the above-described embodiment, the first bearing 20 is disposed in the recess 5c of the handle shaft 5, and the roller clutch 30 is disposed on the outer peripheral side of the second end portion 5b of the handle shaft 5. However, as shown in FIG. 3, the first bearing 20 can be disposed on the outer peripheral side of the second end portion 5b of the handle shaft 5, and the roller clutch 30 may be disposed in the recess 5c of the handle shaft 5.

What is claimed is:

1. A dual-bearing reel, comprising:
a reel body;
a handle shaft having a first end portion and a second end portion on a side opposite the first end portion, and provided on the reel body so as to be rotatable;
a handle connected to the first end portion of the handle shaft;
a first bearing rotatably supporting the second end portion of the handle shaft; and
a roller clutch arranged so as to overlap the first bearing in an axial direction of the handle shaft as seen from a radial direction of the handle shaft and configured to prohibit rotation of the handle shaft in one direction.

2. The dual-bearing reel according to claim 1, wherein the handle shaft has a recess at the second end portion and opening in a first direction from the first end portion to the second end portion,
the first bearing is disposed inside the recess of the handle shaft, and
the roller clutch is disposed on an outer peripheral side of the second end portion of the handle shaft.

3. The dual-bearing reel according to claim 2, wherein the reel body has a support shaft disposed inside the recess of the handle shaft and supporting the first bearing.

4. The dual-bearing reel according to claim 3, further comprising
a cylindrical member mounted on the handle shaft so as to be integrally rotatable therewith, between the first end portion and the second end portion of the handle shaft, and
a second bearing rotatably supporting the handle shaft via the cylindrical member,
the reel body has a frame including the support shaft and a cover covering one side of the frame,
the second bearing is disposed on the cover, and
the cylindrical member has a projection protruding from an outer circumferential surface of the cylindrical member in the radial direction of the handle shaft and configured to restrict movement of the second bearing in the first direction.

5. The dual-bearing reel according to claim 1, wherein in the handle shaft, an outer diameter of the second end portion is larger than an outer diameter of the first end portion.

* * * * *